(12) United States Patent
Strobel et al.

(10) Patent No.: US 10,389,596 B2
(45) Date of Patent: Aug. 20, 2019

(54) DISCOVERING APPLICATION TOPOLOGIES

(71) Applicant: CA, Inc., Islandia, NY (US)

(72) Inventors: Scott Strobel, Islandia, NY (US); Ryan Clemens, Islandia, NY (US); William Hunt, Islandia, NY (US); Jester Goldman, Islandia, NY (US)

(73) Assignee: CA, Inc., Islandia, NY (US)

( * ) Notice: Subject to any disclaimer, the term of this patent is extended or adjusted under 35 U.S.C. 154(b) by 302 days.

(21) Appl. No.: 15/474,063

(22) Filed: Mar. 30, 2017

(65) Prior Publication Data
US 2018/0287876 A1  Oct. 4, 2018

(51) Int. Cl.
| | | |
|---|---|---|
| *G06F 15/16* | (2006.01) | |
| *H04L 12/24* | (2006.01) | |
| *H04L 29/08* | (2006.01) | |
| *H04L 12/26* | (2006.01) | |

(52) U.S. Cl.
CPC ............ *H04L 41/12* (2013.01); *H04L 41/142* (2013.01); *H04L 41/5058* (2013.01); *H04L 67/1004* (2013.01); *H04L 41/5035* (2013.01); *H04L 43/062* (2013.01); *H04L 43/0817* (2013.01)

(58) Field of Classification Search
CPC ............................ H04L 41/12; H04L 41/5058
See application file for complete search history.

(56) References Cited

U.S. PATENT DOCUMENTS

| | | | | |
|---|---|---|---|---|
| 7,702,667 | B2* | 4/2010 | Yahalom | G06F 16/2308 707/611 |
| 9,742,639 | B1* | 8/2017 | Zhang | H04L 41/0853 |
| 2003/0097438 | A1* | 5/2003 | Bearden | H04L 41/0213 709/224 |
| 2013/0091252 | A1* | 4/2013 | Pizzorni | G06Q 10/10 709/219 |
| 2013/0166601 | A1* | 6/2013 | Chrapko | G06Q 10/00 707/798 |
| 2014/0044004 | A1* | 2/2014 | Oda | H04L 41/5067 370/253 |
| 2014/0105031 | A1* | 4/2014 | McDysan | H04L 45/302 370/242 |
| 2014/0105039 | A1* | 4/2014 | McDysan | H04L 45/306 370/252 |

(Continued)

OTHER PUBLICATIONS

Connected component (graph theory)', Wikipedia, https://en.wikipedia.org/wiki/Connected_component_graph_theory), Nov. 21, 2016, pp. 1 to 3.

(Continued)

*Primary Examiner* — Douglas B Blair
(74) *Attorney, Agent, or Firm* — Pillsbury Winthrop Shaw Pittman LLP

(57) ABSTRACT

Provided is a process including: obtaining, with one or more processors, network-traffic data describing a graph of network traffic among a plurality of hosts of one or more distributed applications executing on a plurality of computing devices between which the network traffic is sent; inferring, with one or more processors, a topology of a first distributed application among the one or more distributed applications based on the network-traffic data; causing, with one or more processors, a visual representation of the topology to be presented in a graphical user interface.

20 Claims, 5 Drawing Sheets

(56) References Cited

U.S. PATENT DOCUMENTS

| | | | | |
|---|---|---|---|---|
| 2014/0105062 | A1* | 4/2014 | McDysan | H04L 45/306 370/254 |
| 2014/0105216 | A1* | 4/2014 | McDysan | H04L 67/1095 370/400 |
| 2015/0381515 | A1* | 12/2015 | Mattson | H04L 41/145 707/609 |
| 2016/0191568 | A1* | 6/2016 | Nispel | H04L 43/04 726/1 |
| 2016/0234073 | A1* | 8/2016 | Maes | H04L 41/12 |
| 2016/0269482 | A1* | 9/2016 | Jamjoom | H04L 67/1095 |
| 2016/0277250 | A1* | 9/2016 | Maes | H04L 41/145 |
| 2016/0294632 | A1 | 10/2016 | Bhatia et al. | |
| 2016/0366034 | A1 | 12/2016 | Ladha et al. | |
| 2016/0380842 | A1 | 12/2016 | Cordray et al. | |
| 2017/0048100 | A1 | 2/2017 | Delinocci | |
| 2017/0063635 | A1 | 3/2017 | Choi | |
| 2017/0093645 | A1* | 3/2017 | Zhong | G06F 3/0482 |
| 2017/0093702 | A1 | 3/2017 | Teng et al. | |
| 2017/0093748 | A1 | 3/2017 | Kallin et al. | |
| 2018/0219743 | A1* | 8/2018 | Garcia | H04L 41/12 |
| 2018/0278675 | A1* | 9/2018 | Thayer | G06F 16/252 |
| 2018/0278725 | A1* | 9/2018 | Thayer | H04L 69/08 |
| 2018/0287903 | A1* | 10/2018 | Joshi | H04L 67/00 |
| 2018/0288129 | A1* | 10/2018 | Joshi | H04L 43/08 |

OTHER PUBLICATIONS

Strongly connected component, Wikipedia, https://en.wikipedia.org/wiki/Strongly_connected_component, Jan. 17, 2017, pp. 1 to 3.

PCC-PCE Communication and PCE Discovery Requirements for Inter-Layer Traffic Engineering, https://web.archive.org/web/20160514093759/https://tools.ietf.org/html/rfc6457, May 14, 2016, pp. 1 to 12.

Cisco Nexus Data Broker for Network Traffic Monitoring and Visibility Guide, https://web.archive.org/web/20160310145713/http://www.cisco.com/c/en/us/products/collateral/cloud-systems-management/nexus-data-broker/guide-c07-731460.html, Mar. 10, 2016, pp. 1 to 17.

IDFAQ: How can passive techniques be used to audit and discover network vulnerability?, https://web.archive.org/web/20170318073225/https://www.sans.org/security-resources/idfaq/how-can-passive-techniques-be-used-to-audit-and-discover-network-vulnerability/3/15, Mar. 18, 2017, pp. 1 to 13.

Network topology discovery systems and methods and their use in testing frameworks for determining suitability of a network for target applications, https://web.archive.org/web/20161012131546/https://www.google.com/patents/US20030097438, Oct. 12, 2016, pp. 1 to 32.

Network Monitoring Tools, https://web.archive.org/web/20170309120719/https://www.slac.stanford.edu/xorg/nmtf/nmtf-tools.html, Mar. 9, 2017, pp. 1 to 34.

Automating Network Application Dependency Discovery: Experiences, Limitations, and New Solutions, https://www.usenix.org/legacy/event/osdi08/tech/full_papers/chen_xu/chen_xu_html/index.html, Dec. 8-10, 2008, pp. 1 to 22.

CA Application Delivery Analysis, https://web.archive.org/web/20161104142138/https://www.ca.com/us/products/ca-application-delivery-analysis.html, Nov. 4, 2016, pp. 1 to 6.

* cited by examiner

DISCOVERING APPLICATION TOPOLOGIES

BACKGROUND

1. Field

The present disclosure relates generally to distributed computing and, more specifically, to discovering application topologies.

2. Description of the Related Art

Distributed applications are computer applications implemented across multiple network hosts, often across multiple computers. The computers generally each execute at least part of the application's code and cooperate to provide the functionality of the application. Examples include client-server architectures, in which a client computer cooperates with a server to provide functionality to a user. Another example is an application having components replicated on multiple computers behind a load balancer to provide functionality at larger scales than a single computer. Some examples have different components on different computers that execute different aspects of the application, such as a database management system, a storage area network, a web server, an application program interface server, and a content management engine that cooperate to provide a website to a browser or resources to a native application.

These applications can be characterized as a service composed of a variety of other services, which may themselves be composed of other services. Examples of a service include a component (e.g., one or more executing bodies of code) that communicates via a network (or loopback network address) with another component, often by monitoring a port of a network address of the computer upon which the service executes. Services composed of other services generally form a service hierarchy (e.g., a service tree) that terminates in leaf nodes composed of computing hardware each executing a given low level service. In some cases, a given node of this tree may be present in multiple trees for multiple root services.

As distributed applications have grown more complex in recent years, and as the scale of computing loads has grown, many distributed applications have been designed (or redesigned) to use more, and more diverse, services. Functionality that might have previously been implemented within a single thread on a single computing device (e.g., as different sub-routines in a given executable) has been broken-up into distinct services that communicate via a network interface, rather than by function calls within a given thread. Services in relatively granular architectures are sometimes referred to as a "microservice." These microservice architectures afford a number of benefits, including ease of scaling to larger systems by instantiating new components, making it easier for developers to reason about smaller portions of complex systems, and increased reuse of code across applications.

SUMMARY

The following is a non-exhaustive listing of some aspects of the present techniques. These and other aspects are described in the following disclosure.

Some aspects include a process of inferring a topology of a distributed application based on transport-layer metadata in network traffic, the process including: obtaining, with one or more processors, network-traffic data describing a graph of network traffic among a plurality of hosts of one or more distributed applications executing on a plurality of computing devices between which the network traffic is sent, wherein: the obtained network-traffic data describes a plurality of packets of data, the packets each have a sender network address and a sender port number, the packets each have a recipient network address and a recipient port number, the packets are sent in the course of executing the one or more distributed applications, and the graph of network traffic is a directed graph in which nodes of the graph correspond to hosts of the one or more distributed applications, edges correspond to packets sent between the hosts, and directions of edges correspond to the direction in which the packets are sent; inferring, with one or more processors, a topology of a first distributed application among the one or more distributed applications based on the network-traffic data, the topology indicating which hosts are part of the first distributed application and which hosts communicate with which other hosts in first distributed application, wherein inferring the topology comprises: ascertaining a connected component of the graph of network traffic based on the network traffic data, wherein: the connected component has nodes in which every node is reachable directly or indirectly by every other node via edges between the respective nodes in the graph of network traffic, and the connected component corresponds to the first distributed application; and ascertaining a gateway host of the first distributed application based on the connected component, the gateway host being a host through which users of the first distributed application interface with the first distributed application; and causing, with one or more processors, a visual representation of the topology to be presented in a graphical user interface.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
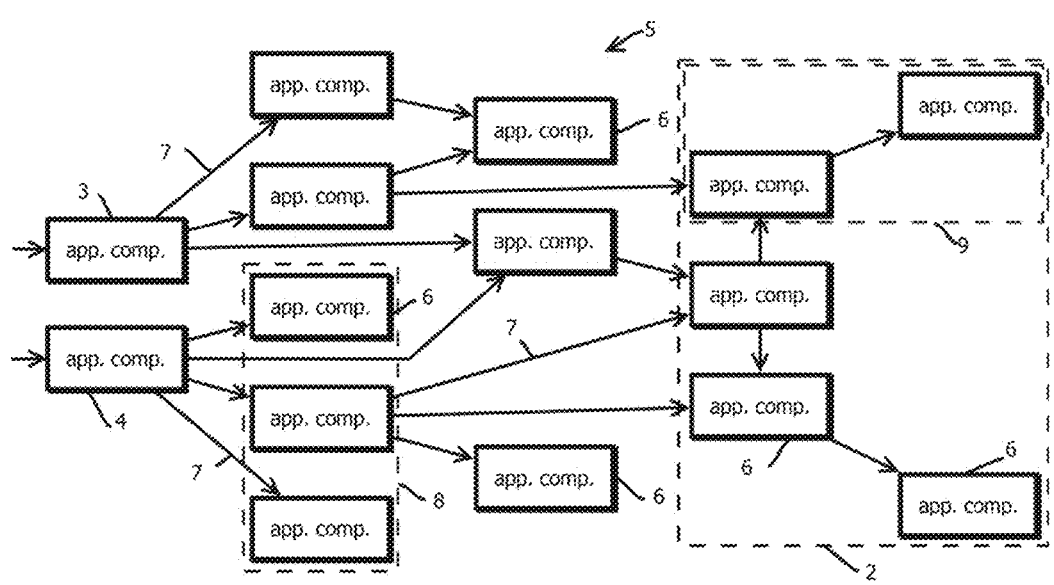
FIG. 1 is a block diagram of an example of a distributed application that may be analyzed with embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of network engineering and distributed computing software architecture. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Distributed web applications (and other hosted distributed applications) are often formed from a relatively fluid and complex collection of hosts (e.g., computers, virtual machines, containers, microkernels, etc. having a network address). For example, for a given web application, a datacenter may include (among several hundred or thousand other hosts serving different roles for different applications) first and second web servers behind a first load balancer; first, second, and third application servers behind a second load balancer; and first and second database servers (e.g., arranged in a pipeline with redundancy in each stage). These components may communicate via remote procedure calls to provide an application having an entry point at one of the web servers.

Taking inventory of which hosts in the datacenter serve which roles in which application is complex. The arrangements can be large and interconnected (e.g., with some hosts participating in different applications). A typical commercial layout currently has around 48 servers, and this number is expected to increase with the advent of microservices and containers. And the arrangements can change over time, in some cases automatically, e.g., someone could add a load balancer that favors application servers 2 and 3 exclusively, possibly due to faster performance, making application server 1 no longer an effective part of the application. Often, the "as designed" topology of an application deviates substantially from the evolving "as built" topology. As a result, it can be difficult for developers and operations engineers to reason about any one distributed application, trouble shoot problems, or analyze the application for areas to improve. These and other issues may be mitigated by techniques exemplified below. It should be emphasized that some embodiments may implement only a subset of these techniques, as they are independently useful, or they may be used together.

Some embodiments analyze layer-four (in the Open Systems Interconnection model) network traffic to infer the topology of a distributed application having an unknown topology (e.g., at least partially unknown). Some embodiments may also infer which host in the topology serves as the entry point to topology. Some embodiments present a user interface in which a user (e.g., a developer or operations engineer tasked with building or supporting the distributed application) may select among inferred entry points and then build out a topology of an application by selecting among inferred candidate members (e.g., hosts) of the topology. Some embodiments store in memory the resulting topology and cause the display of user interfaces with the topology (e.g., in a columnar graph) with metrics related to the hosts. In some cases, evolution of the topology over time is captured by specifying a duration of time over which the topology is to be described. These and other techniques described below are better understood in view of an example distributed application 5 shown in FIG. 1. Element numbers in this figure are repeated to identify examples of features having the same or similar roles.

In some embodiments, the distributed application 5 includes two gateway hosts 3 and 4. In some embodiments, the gateway hosts 3 and 4 may execute application components that provide a service through which users of the distributed application 5 interface with the distributed application 5. In some cases, those users are other applications, for example, making application program interface requests, and in some cases, those users include native applications and web browsers requesting content or otherwise interacting with the distributed application 5. For example, the gateway hosts 3 and 4 may be a web server and an application program interface server respectively. In some cases, a distributed application 5 may have a single gateway, or in some cases, a distributed application may have multiple gateways, for example, corresponding to different ways of accessing the distributed application or sharing a workload from an upstream load balancer, e.g., a reverse proxy may allocate computing load among gateway nodes by hashing a session identifier and mapping different sets of hash values to network addresses of the gateway hosts 3 and 4 (e.g., one may receive requests with even hash values and the other may receive those with odd values).

In some embodiments, the topology of the distributed application 5 may change over time, for example, as additional hosts are added or removed based on workload due to elastic scaling. For example, some embodiments may place a plurality of instances of a given service, each instance executing a copy of the same application component, behind a load balancer, and some embodiments may add additional instances as load increases or remove instances as load decreases. Further, some embodiments may house services that are re-factored to break up more feature-rich services into smaller groups of microservices that collectively constitute in the aggregate another example of a service. In some cases, the as-designed topology of the distributed application may deviate, and some cases substantially, from the as-built topology as a result of these and other sources of change in the arrangement of hosts executing application components of the distributed application 5. In some cases, the topology of the distributed application may be partially or entirely unknown to a developer or operations engineer at a given point in time, and determining this topology may be relatively difficult, particularly in public cloud installations in which developers and engineers do not readily have access to the underlying hardware. Further, even when such access is available, for example, in on-premises installations, ascertaining the topology can be relatively difficult, and in some cases, the topology can change before the topology is ascertained in a given analysis, yielding a topology that is outdated and unreliable.

The illustrated topology of FIG. 1 is a relatively simple example used to illustrate the present techniques, so it should be appreciated that commercial embodiments are likely to process information related to substantially more complex distributed applications than that shown in FIG. 1.

In this example, the distributed application 5 includes 15 application components executing on respective hosts, but embodiments are expected to process monitoring information from distributed applications including substantially more application components, for example, exceeding 50, 100, and in some cases, 1000 different application components. In some cases, some of the application components are duplicate instances that operate concurrently, for instance, behind load balancers, to service transactions at larger scales. In some cases, there may be more than 50, 100, or 1000 different types of application components, with more than two, more than five, or more than 50 different instances of some of the different types.

In some embodiments, the distributed application 5 is partially or entirely implemented with a service-oriented architecture in which the different application components 6 (corresponding to different hosts in some cases) are different instances of various services. In some cases, the services may be characterized as "microservices," a term used to refer to services in a relatively granular architecture in which the functionality of the distributed application is divided into a relatively large number of different services each having a relatively focused functionality. It is expected that industry will move towards increased use of microservices in the future, which is expected to make the above-describe problems even more acute.

Each service is a different program or instance of a program executing on one or more computing devices. Thus, unlike different methods or subroutines within a program, the services in some cases do not communicate with one another through shared program state in a region of memory assigned to the program by an operating system on a single computer and shared by the different methods or subroutines. Rather, the different services may communicate with one another through network interfaces, for instance, by messaging one another with application program interface (API) commands (having in some cases parameters applicable to the commands) sent to ports and network addresses associated with the respective services (or intervening load balancers). In some cases, each port and network address pair refers to a different host, such as a different computing device, from that of a calling service. In some cases, the network address is a loopback address referring to the same computing device. Interfacing between services through network addresses, rather than through shared program state, is expected to facilitate scaling of the distributed application 5 through the addition of more computing systems and redundant computing resources behind load balancers. In contrast, often a single computing device is less amenable to such scaling as hardware constraints on even relatively high-end computers can begin to impose limits on scaling relative to what can be achieved through distributed applications.

In some cases, each of the services may include a server (e.g., an executed process) that monitors a network address and port (i.e., a network socket) associated with the service (e.g., an instance of a service with a plurality of instances that provide redundant capacity). In some embodiments, the server (e.g., a server process executing on the computing device) may receive messages, parse the messages for commands and parameters, and call appropriate routines to service the command based on the parameters. In some embodiments, some of the servers may select a routine based on the command and call that routine.

In some cases, the distributed application 5 may be characterized with a topology like that shown in FIG. 1, which may indicate which application components call which other application components, as indicated by links 7 in the illustrated logical architecture topology, depicting a type of a graph data structure. Further, in some cases, the topology may indicate groups of application components, such as group 8, that provide redundant capacity. In some cases, each application components 6 within group 8 may be a duplicate instance of the same service (which is not to imply that program state is identical at any given moment in time or that the instances are not configured differently, for instance, with different network addresses). In some cases, each application component in group 8 may provide the same service to calling application components. One group 8 of multiple instances of the same service is shown, but it commercial embodiments are expected to include many such groups, often with substantially more instances in each group. Often, to operate at commercially relevant scales, with acceptable uptimes, and acceptable latency, distributed applications include redundancy at all or nearly all services, as loads placed on the distributed application can fluctuate with time and individual computing devices and application components are expected to fail from time to time.

Further, in some cases, application components may be nested, as indicated by an application component 9 that includes two lower-level application components. Often, services are made up of other services, which may themselves be made from other services. In some cases, a given service may be part of multiple other services. Further, in some cases, a given service may be part of multiple distributed applications. In some embodiments, a hierarchy of services may be characterized by a service tree in which higher-levels in the tree call lower-levels in the tree in order to provide their respective service. In some cases, the service tree may include two, three, five, ten, or more different layers of hierarchy. For example, FIG. 1 shows another service 2 that includes service 9 along with several other application components 6 each providing a service, some of which are accessed directly by some other application components without a call to service 2.

The distributed application 5 may be any of a variety of different types of distributed applications, in some cases implemented in one or more datacenters. In some cases, the distributed application is a software-as-a-service (SaaS) application, for instance, accessed via a client-side web browser or via an API. Examples include web-based email, cloud-based office productivity applications, hosted enterprise resource management applications, hosted customer relationship management applications, document management applications, human resources applications, Web services, server-side services for mobile native applications, cloud-based gaming applications, content distribution systems, and the like. In some cases, the illustrated distributed application 5 interfaces with client-side applications, like web browsers via the public Internet, and the distributed application 5 communicates internally via a private network, like a local area network, or via encrypted communication through the public Internet.

As discussed, distributed applications are often relatively complex and difficult for developers and operations engineers to reason about and troubleshoot, particularly as the "as built" topology evolves over time. In some embodiments, these and other issues described below and that will be apparent to one of ordinary skill in the art may be mitigated by a topology analyzer 12 in the computing environment 10 shown in FIG. 2. In some cases, this topology analyzer 12 may execute a process described below with reference to FIG. 3 in order to analyze network traffic and infer a topology of a distributed application.

Further, some embodiments may be operative to infer or otherwise ascertained gateway hosts of the distributed application, in some cases, where the computing devices upon which the distributed application executes are also executing, at least in part, a plurality of other distributed applications, for example in a datacenter.

The operation of the topology analyzer 12 is best understood in view of the computing environment 10 in which it operates. In some embodiments, the computing environment 10 is a distributed computing environment including a relatively large number of computing devices, for instance, deployed over several datacenters or enterprise local area networks. In many cases, the number of computing devices with which the computing environment 10 is implemented is expected to exceed 10, and in many commercially relevant use cases, 100, or 1000. In this example, the computing environment 10 includes the topology analyzer 12, an infrastructure monitor 16, an application monitor 18, a plurality of monitored computing devices 20, 22, and 24 executing a monitored distributed application, and a network 26, such as the Internet or various other intermediary networks, like local area networks.

Figure 2:
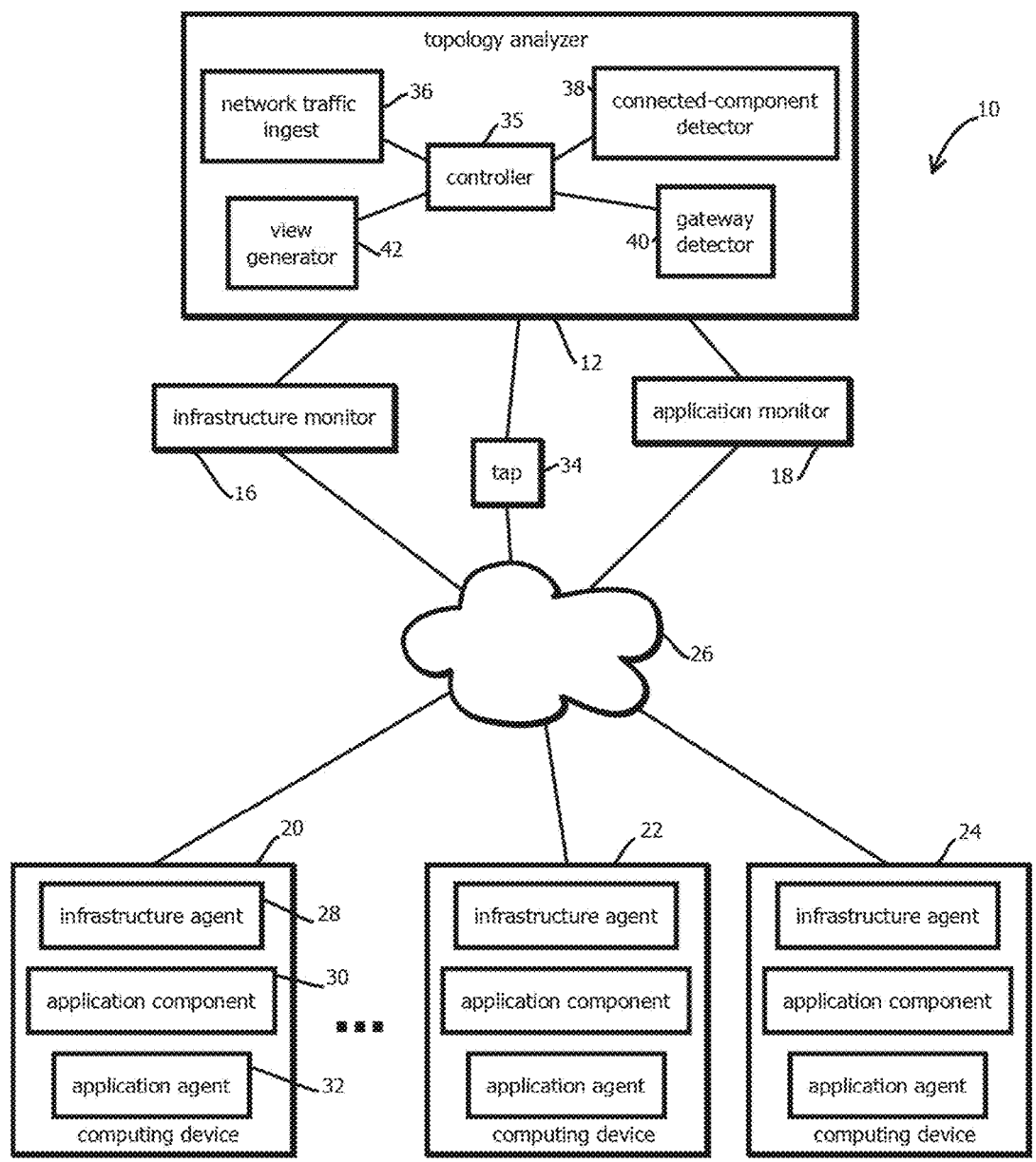
FIG. 2 is a block diagram of a computing environment having a topology analyzer configured to score alarms in accordance with embodiments of the present techniques.

In some embodiments, the components of the system of FIG. 2 may be implemented with a plurality of the computing devices described below with reference to FIG. 5, for instance, with rack-mounted computing devices in a datacenter or a plurality of datacenters configured to communicate with one another via various networks, such as local area networks and the Internet. In some cases, the monitoring application may route communicate via a different network than that of the distributed application. For instance, the monitoring applications may communicate via an out-of-band network in a datacenter, while the distributed application may communicate via an in-band network. Out-of-band communications are expected to reduce an attack surface of the distributed application by maintaining at least some interfaces of the monitoring application on a network that is not exposed to the public Internet. Or in some cases, these communications may be consolidated on a single network, for instance to simplify the physical architecture.

Three computing devices 20, 22, and 24 are shown, but embodiments are expected to typically include many more, for instance, numbering in the dozens, hundreds, or thousands or more. In some embodiments, the computing devices 20, 22, and 24 may be rack-mounted computing devices in a datacenter, for instance, in a public or private cloud datacenter. In some embodiments, the computing devices 20, 22, and 24 may be geographically remote from one another, for instance, in different datacenters, and geographically remote from the other components 12, 14, 16, and 18, or these components may be collocated.

In some embodiments, the network 26 includes the public Internet and a plurality of different local area networks, for instance, each within a different respective datacenter connecting to a plurality of the computing devices 20 through 24. In some cases, the various components may connect to one another through the public Internet via an encrypted channel. In some cases, a datacenter may include an in-band network through which the data operated upon by the application is exchanged and an out-of-band network through which infrastructure monitoring data is exchanged. Or some embodiments may consolidate these networks.

In some embodiments, each of the computing devices 20 through 24 may execute a variety of different routines specified by installed software, which may include application software, monitoring software, and an operating system. Application software, in this context, serves a different purpose from monitoring software. The application software generally executes in service of a business function or other workload for which the computing environment 10 was provisioned by a user. In contrast, the monitoring software monitors, and in some cases manages, the operation of the application software or the computing devices upon which the application software is executed. In some embodiments, the computing environment 10 may execute a plurality of different distributed applications, in some cases intermingling components of these distributed applications on the same computing devices and, in some cases, with some of the distributed applications providing software tools by which other distributed applications are deployed, monitored, and adjusted. It is helpful to generally discuss these applications before addressing other components thereof within the computing environment 10. In some cases, such applications may be categorized as workload applications and infrastructure applications. The workload applications may service tasks for which the computing environment is designed and provided, e.g., hosting a web-based service, providing an enterprise resource management application, providing a customer-relationship management application, providing a document management application, providing an email service, or providing an industrial controls application, just to name a few examples. In contrast, infrastructure applications may exist to facilitate operation of the workload application. Examples include monitoring applications, logging applications, container management applications, and the like.

In some cases, the topology to be analyzed is that of the workload application software, which may be a distributed application, meaning that different components of the application software execute on different hosts, for instance, on different computing devices, in different virtual machines, in different containers, or in different operating systems having different memory address spaces. In some embodiments, each computing device may have a single host, or a given computing device may have multiple hosts, for instance, in the case of a computing device executing multiple virtual machines, each having a virtual machine operating system and executing within an operating system of the computing device. In some cases, each host may have a different network layer host address. A "host" need not be labeled as a host in program code or data structures to constitute a host, e.g., often hosts may be labeled as "servers" or "guests."

In many cases, the application software is implemented with different application components 30 executing on the different hosts. In some cases, the different application components may communicate with one another via network messaging, for instance, via a local area network, the Internet, or a loopback network address on a given computing device. In some embodiments, the application components communicate with one another via respective application program interfaces, such as representational state transfer (REST) interfaces, for instance, in a microservices architecture. In some embodiments, each application component includes a plurality of routines, for instance, functions, methods, executables, or the like, in some cases configured to call one another. In some cases, the application components are configured to call other application components executing on other hosts, such as on other computing devices, for instance, with application program interface request including a command and parameters of the command. In some cases, some of the application components 30 may be identical to other application components on other hosts, for instance, those provided for load balancing purposes in order to concurrently service transactions. In some cases, some of the application components may be distinct from one another and serve different purposes, for instance, in different stages of a pipeline in which a transaction is processed by the distributed application. An example includes a web server that receives a request, a controller that composes a query to a database based on the request, a database that services the query and provides a query result, and a view generator that composes instructions for a web browser to render a display responsive to the request to the web server. Often, pipelines in commercial implementations are substantially more complex, for instance, including more than 10 or more than 20 stages, often with load-balancing at the various stages including more than 5 or more than 10 instances configured to service transactions at any given stage. Or some embodiments have a hub-and-spoke architecture, rather than a pipeline, or a combination thereof. In some cases, multiple software applications may be distributed across the same collection of computing devices, in some cases sharing some of the same instances of application components, and in some cases having distinct application components that are unshared.

With the complexity that can arise in distributed applications, it can be difficult to diagnose application performance issues or infrastructure issues. Accordingly, some embodiments include monitoring software. The monitoring software is of two distinct types that, while they both perform monitoring, perform functions recognized as in industry as being in distinct product categories traditionally: infrastructure monitoring, and application monitoring (e.g., application performance monitoring or application delivering monitoring). The former can be analogized to the diagnostic software used by an automotive mechanic to monitor a car's engine, while the latter can be analogized to GPS navigation software by which a car's direction and speed is tracked. Both relate to the operation of the car, but they are distinct categories of software. A similar relationship exists for application monitoring and infrastructure monitoring applications.

In some embodiments, the infrastructure monitoring software may be a distributed infrastructure management application that includes the infrastructure monitor 16 and infrastructure agents 28 installed on the computing devices 20 through 24. In some embodiments, the infrastructure agent may be installed on networking equipment as well, for instance, on switches and routers. Or some embodiments are partially or entirely agentless, and metrics, events, and attributes may be gathered with the various protocols described below for this purpose.

In some embodiments, the infrastructure agent is configured to gather attributes of the computing host upon which the infrastructure agent executes, such as a host name (or other type of host identifier), a network address, a medium access control address, a domain name service, a datacenter identifier, a datacenter region, a processor model, a processor speed, amounts of processor memory of various types of cache (e.g. L1 and L2), an operating system name, an operating system version, operating system configurations, firmware names, firmware versions, driver names, driver versions, installed application names, installed application versions, amounts of memory available in random access memory, memory speed, amounts of persistent storage available, persistent storage speed, and the like. In some embodiments, the infrastructure agent is configured to gather metrics of the host upon which the infrastructure agent executes, for instance, processor utilization, memory utilization, temperature, network bandwidth, network latency, rates of packet loss on networks, and the like. In some embodiments, the infrastructure agent is configured to gather events, such as alarms, indicative of occurrences at the host upon which the infrastructure agent executes, for instance, instances of the above metrics crossing (or changing faster than) a threshold, operating system errors, crashes, reboots, corrupted memory being detected, and the like.

In some embodiments, the infrastructure agent may be configured to report such gathered information to the infrastructure monitor 16, for instance, periodically, and buffer the information between reports. In some embodiments, the infrastructure agent may be configured to receive requests for such information from the infrastructure monitor 16 and respond with responsive information, for instance, all information buffered, or information responsive to a query from the infrastructure monitor 16.

In some embodiments, the infrastructure agent 28 may include a plurality of "probes," which may be routines configured to gather information pertaining to a particular use case for the host, for example, probes configured to gather information about databases, email servers, web servers, and the like. In some embodiments, some infrastructure agents may have a plurality of probes and different infrastructure agents may have different pluralities of probes. Or in other architectures consistent with the present techniques, each "probe" may be characterized as an agent, e.g., a single host may have multiple specialized infrastructure or application performance monitoring agents.

In some use cases, system administrators do not have a way to easily take inventory of the computing devices upon which a given distributed application or plurality of distributed applications execute. Often computing devices or hosts executing thereon, are added and removed relatively frequently, often over diverse geographic areas, in some cases automatically responsive to changes in the applied load or crashes or maintenance elsewhere in the system. To ease this burden, some embodiments of the infrastructure monitor 16 are configured to automatically discover newly added hosts within a domain, for instance, new virtual machines that were added or new computing devices that were added. In some cases, the infrastructure monitor 16 may periodically, or in response to a command, scan a range of network addresses, like in a private subnet, with request sent according to various network management protocols, like Simple Network Management Protocol (SNMP), Secure Shell (SSH), Windows Management Instrumentation (WMI), or Internet Control Message Protocol (ICMP). If a computing device is not at a given address in the range, no response may be received within a threshold duration of time, and that address may be disregarded. In contrast, a new computing device or other host at a given address, upon receiving the network management protocol request may respond to the request, indicating the presence of a host. Upon detecting a new host, some embodiments of the infrastructure monitor 16 may direct the host to install an instance of the infrastructure agent and, in some cases, configure various probes thereon based upon a role indicated by the host.

In some embodiments, the infrastructure monitor 16 may receive information reported from the infrastructure agents and generate various dashboards, reports, and alarms based on this information. In some embodiments, the infrastructure monitor 16 is further configured to automatically take remedial action, for instance, provisioning additional computing devices responsive to thresholds being exceeded, like thresholds indicating CPU or memory usage greater than a threshold amount. In some embodiments, the infrastructure monitor 16 may organize the received information according to an identifier of a host upon which the infrastructure agent reporting the information is executing. Based upon discovered hosts, and in some cases information reported by those hosts, some embodiments of the infrastructure monitor 16 may construct a network-architecture topology of a physical architecture of computing devices within a domain. In some cases, this network-architecture topology may include network-architecture host identifiers for each of the hosts that were discovered or otherwise identified (for instance, manually identified and configured by a system administrator). In some cases, these host identifiers may be specified by a system administrator, or in some cases, the host itself.

In some embodiments, as discussed above, the monitoring software further includes application monitoring software, such as application performance management software. For example, some embodiments may include a distributed application performance management application including the application monitor 18 and an application agent 32 (or plurality of application agents) executing on the computing devices 20 through 24. In some embodiments, the application agents may be configured to monitor performance of the application component 30. Monitoring performance may take a number of forms, and examples include measuring response times of various routines of the application component 30, for instance, durations of times elapsed between when a given routine is called and when the given routine returns a response. Other examples include gathering errors thrown by routines. In some embodiments, routines may be instrumented by adding calls to the application agent at the beginning and ends of the routines, such that the application agent receives a signal when a given routine in a given execution instance begins and ends, and the application agent may determine response times based on the signals by subtracting the time at which the begin signal was received from the time at which the end signal was received. In some embodiments, these routines may receive such signals from an operating system of a host. In some cases, the application agent and application component may be configured before both are installed on a computing device. For instance, code for the application component may be instrumented with calls to the application agent before that code is installed in a machine image or the computing device 20-24 that receives that machine image.

In some embodiments, the application agent 32 may gather attributes, metrics, and events of application components and report that gathered information to the application monitor 18, for instance, buffering the information and sending it periodically or sending the information responsive to queries. In some embodiments, the application monitor 18 may aggregate information gathered from a plurality of application agents executing on the computing devices 20 through 24 for a given distributed application and generate various dashboards, reports, and alarms. In some embodiments, the application monitor 18 may be configured to group reported metrics according to a given transaction serviced by the distributed application. For instance, a given website request and the chain of events in a pipeline by which the given website request is serviced is an example of a transaction. In many cases, the distributed application may service a relatively large number of transactions concurrently, for instance, after a relatively large number of users make requests at around the same time. Some embodiments may be configured to, for a given transaction, determine a total response time for the transaction, for instance, as perceived by a user, indicating a difference in time between when a request was received and when a response was provided for a user. Further, some embodiments may be configured to segment that response time for the transaction according to the contribution of each of the application components and routines therein. The various reports analyses, and dashboards described herein may be formed by instructing a computing device to render a graphical user interface depicting the same, for instance, by sending instructions to a web browser on a remote computing device or instructing a display of a computing device upon which the respective monitor 16 or 18 is executing. Thus, in some cases, a developer may be able to query the application monitor 18 for particularly slow transactions (or transactions for which an error occurred) and drill down into the particular application component and routine that contributed to the slow response or error.

Commercial examples of monitoring software that may be used in accordance with the present techniques include the following, any one of which may be modified to include the topology analyzer or may interface with the topology analyzer in some embodiments.

CA Unified Infrastructure Management (UIM)™ available from CA, Inc. of Islandia, N.Y. may be used to monitor and manage data center deployments and, in particular, those in a multi-tenancy use case, like in the enterprise cloud (e.g., Amazon Web Services™ or Azure™). Some implementations automatically discover computing devices, gather metrics (like CPU usage, memory usage, network activity, etc.) and alarms about the devices, and some implementations aggregate the data in various dashboards and reports. In some cases, this data is gathered and reported to a central server by an agent installed on monitored devices. An administrator console may be used to manually configure and deploy the monitoring agents, also called robots, which may be configured to have "probes," or collections of code configured to monitor a particular type of software. Such probes may be characterized as agents in and of themselves more generally.

CA Application Performance Management (APM)™ available from CA, Inc. of Islandia, N.Y. may be used to monitor the performance of applications by providing fine-grained response times (and other metrics) attributable to portions of a call graph of the application (e.g., indicating which method, of the application called is servicing a request or is running particularly slow). In some cases, this is done by instrumenting the monitored code. An agent may execute on the computing device to receive signals from instrumented code or otherwise monitor the code through operating system interfaces. Embodiments may aggregate such data and present transaction traces that indicate the amounts of time consumed in servicing a user request attributable to various methods and services called when preparing the response to the request.

CA Application Delivery Analysis™ (ADA) available from CA, Inc. of Islandia, N.Y. may also be used to monitor the performance of software, e.g., providing relatively fine-grained measures response time viewed through the lens of network infrastructure. A developer or engineer may use CA ADA to determine that one of 50 servers in distributed system is responsible for a slowdown in a particular application feature for a subset of users. ADA may operate on layer-four of the Open Systems Interconnection (OSI) model, often the transport layer, such as on transport control protocol (TCP) metadata, like packet headers. By monitoring network exchanges, ADA may infer the as-built topology of a distributed application (e.g., what hosts are in a topology (and how they connect in the topology) and where there is redundancy in the topology). Often these topologies have one or more entry hosts (e.g., a web or API server) and a set of downstream hosts that perform back-end processes (e.g., controllers, databases, load balancers, servers that interface with third party API's, etc.).

In some embodiments, the topology analyzer 12 is part of the infrastructure monitor 16 or the application monitor 18, or in some cases the topology analyzer 12 is a stand-alone application. In some embodiments, the topology analyzer includes a controller 35, a network traffic ingest module 36, a connected-component detector 38, a gateway detector 40, and a view generator 42. In some embodiments, the controller 35 may execute the process described below with reference to FIG. 2 and control the operation of the other components 36-42. In some embodiments, the controller 35 corresponds to an entry point into an application embodying the topology analyzer, such as a main routine that calls routines corresponding to the other components.

In some embodiments, the network traffic and ingest module 36 is operative to obtain network-traffic data describing a graph of network traffic among a plurality of hosts executing a plurality of distributed applications on a plurality of computing devices. In some embodiments, the network-traffic data is a copy of packets of layer-four (and lower layer) transport protocol encapsulated messages sent between hosts, for example a raw copy of TCP/IP packets sent over the network. In some embodiments, the packets may be formatted with an Internet Protocol (IP) header and a Transmission Control Protocol (TCP) header collectively including an Internet protocol address of a sender, a network port number of a sender, an Internet protocol address of a recipient, and a network port number of the recipient. Or some embodiments may operate upon User Datagram Protocol (UDP) packets or other transport-layer packets in a similar manner. In some embodiments, the packets may be obtained encapsulated in a lower level protocol, for example, as Ethernet frames, or the packets may be obtained without lower-level protocol encapsulation. In some embodiments, a subset of the packets is obtained, for example metadata of the packets, like headers, quality of service settings, packet sequence numbers, and packet sizes. Processing metadata is expected to facilitate analysis of larger data sets and yield more accurate analyses for a given amount of computing resources, as the payloads may consume a substantial portion of available memory and processing capacity, though embodiments are consistent with both arrangements.

In some embodiments, the network traffic is obtained from a tap 34 on a local area network connecting the computing devices 20, 22, and 24. In some embodiments, the tap may be operative to capture, for example, every packet passing through a given switch or router. In some embodiments, the network traffic may be captured at a network interface of a computing device or a virtual network interface in an operating system of the computing devices 20, 22, and 24. For example, the above-described agents may be operative to capture network traffic and report the network traffic back to the topology analyzer 12, for example, by extracting metadata from headers, buffering the metadata, compressing the metadata, and sending the metadata to the topology analyzer 12, where the compressed metadata may be decompressed by the network traffic ingest module 36 for subsequent analysis.

In some embodiments, the network-traffic data may describe a graph of network traffic among a plurality of hosts executing a plurality of distributed applications. The data and code of the topology analyzer 12 need not explicitly label this information as a "graph" in order for the information to constitute an example of a graph. Rather, it is enough that the information identifies a plurality of hosts corresponding to the nodes of a graph and indicate relationships between the hosts in the form of indications of messages sent from one host to another host (e.g., identifying which hosts communicate at least once with which other hosts). For example, the graph of network traffic may be formatted as a packet capture (pcap) file yielded by executing a tcpdump routine on each of the computing devices 20, 22, and 24, for example, periodically. Or a pcap file may be formed and returned by the tap 34 to the topology analyzer 12. In some cases, the pcap file may indicate sender and recipient network addresses and port numbers, along with timestamps from when the packets were sent or received.

In some embodiments, the network traffic ingest module 36 may execute various transformations upon the received network traffic data, such as metadata of packets, to refine subsequent analyses. In some embodiments, packets may be filtered according to timestamp, or sorted by order for each sender-receiver pair, excluding packets older than a threshold age or count. In some embodiments, packets may be weighted according to a timestamp or sequence, for example, by calculating a half-life or a proportional weighting based on a duration of time or count elapsed since the packet was sent or received.

In some embodiments, the packets may be aggregated according to a direction and pair of hosts, for example, grouping all packets sent from host A to host B in a first group, all packets sent from host B to host A in a second group, all packets sent from host A to host C in a third group, all packets sent from host C to host A in a fourth group, and so on, for example, through each pairwise combination of hosts. Some embodiments may consolidate these groups as a single connection for each instance in which at least one packet is present in the group, for example, adding an edge to the graph to indicate that host A communicates to host B at least once.

Some embodiments may prune these edges based on the amount of packets, for example, removing or determining to not add edges in which there are less than a threshold amount of packets in the corresponding group (it should be noted that "pruning" may be accomplished by only adding edges that satisfy such a threshold and declining to add edges that do not satisfy such a threshold, as "pruning" as used herein does not require that the edge be added and then removed). In some embodiments, such pruning may be based on a weighted combination of the packets in the corresponding group corresponding to a candidate edge. For example, an age-weighted score may be calculated for each group by summing the above-described age-based weights of all packets in the group and determining whether the result satisfies (e.g., is greater than, is greater than or equal to, is less than, or is less than or equal to) a threshold, or some embodiments may determine an average weighting for the group and determine whether the result satisfies a threshold.

Thus, the network-traffic data may describe a directed graph and, in some cases, a weighted directed graph, where weights correspond to the above-described age-weighted scores and direction corresponds to a direction of communication between hosts. In some embodiments, the directed graph may not be a fully connected directed graph and may include a plurality of unconnected groups of hosts, also corresponding to nodes of the graph, which are not reachable directly or indirectly through edges of the unconnected groups. In some cases, these different groups may correspond to different distributed applications executing on at least partially overlapping groups of computers and hosts on those computers.

In some embodiments, these different distributed applications may each have a topology that may be inferred by the connected-component detector 38. In some embodiments, the connected-component detector may receive the network-traffic data (in some cases subject to the above-described transformations) describing the graph of network traffic from the network traffic ingest module 36. In some embodiments, the network traffic data may be transformed to filter and weight edges of the graph as described above, or some embodiments may send the raw network traffic or network traffic data in which duplicative instances of messages between a given pair of hosts have been removed to expedite processing and compress the data.

In some embodiments, the connected-component detector 38 may be configured to detect a plurality of connected components of the graph of network traffic, each connected component corresponding to a different distributed application. Different types of connected components may be detected with different techniques, e.g., depending upon whether a directed or undirected version of the graph is analyized.

The connected components, in some cases, may be determined from an undirected version of the graph of network traffic. An undirected version may be obtained by disregarding values indicating an edge direction, or some embodiments may create a new copy of the graph of network traffic that does not include values indicating direction. For example, an edge in the directed version of a graph may indicate that host A communicates messages to host B, but not vice versa, while the undirected version may simply indicate that host A communicates with host B, regardless of the direction in which messages are sent therebetween.

Connected components are collections of nodes in a graph in which every pairwise combination of nodes in the collection is reachable from one another through at least one path along edges between members of the collection. For example, a distributed application executing upon 37 hosts each of which communicate with at least one of the other 37 hosts is expected to yield a connected component with 37 nodes.

To detect connected components, some embodiments may maintain a data structure that identifies each of the nodes of the graph of network traffic and, for each node, a value indicating whether the corresponding node has been assigned to a connected component and an identifier of that connected component if such an assignment has occurred. Some embodiments may select, for example arbitrarily, a node among those that have not yet been assigned to a connected component. Some embodiments may then traverse the graph of network traffic, starting with the selected node, for example, by identifying every edge connecting to that node, and then identifying the nodes to which those edges connect. Some embodiments may then repeat this process of identifying edges and nodes connected to those edges for each identified node. For example, if node A connects to nodes B and C by two respective edges, some embodiments may identify nodes B and C, and then determine which edges of B and C (other than those currently explored in virtue of connecting to node A) in a current or past traversal, connect to nodes B and C. From there, some embodiments may determine that node C connects to nodes D, E and F, and this process may be repeated along those paths. In this process, some embodiments may maintain a list of edges (e.g., defined by pairs of node identifiers of nodes connected by the edge) that have been traversed, and disregard those already traversed.

In some embodiments, a routine that identifies edges connected to a node, determines whether those edges have already been traversed, and then identifies nodes connected to those edges that have not been traversed may be configured to call itself recursively for each identified node along those edges that have not been traversed, listing the identified node as an argument in the function call to indicate a starting point for the function. Each detected node may be added to a current connected component being ascertained, e.g., in a listing of nodes that is initialized to null before arbitrarily selecting among unassigned nodes to start a new traversal. In some embodiments, the connected components may be detected through a depth-first traversal or a breadth-first traversal of the graph, starting with an arbitrarily selected node among those that have not yet been assigned to a connected component. Some embodiments may repeat these traversals until there are no remaining nodes that have not yet been assigned to a connected component, in some cases yielding 2, 5, 10, 50, or more connected components of the graph of network traffic, with each connected component corresponding to a topology of a different distributed application, e.g., executing within a datacenter.

Additionally or alternatively, some embodiments may operate upon directed versions of the graph of network traffic. For example, in some cases, the connected component may be a strongly connected subset of the graph of network traffic. Strongly connected components may be collections of nodes in which every node is reachable from every other node within the collection along directed edges (and thus, edges extending in one direction are not said to connect in the other direction) between nodes of the collection. A variety of different algorithms may be executed to implement detection of strongly connected components, including algorithms configured to detect strongly connected components in linear time, for example, Kosaraju's algorithm (which may execute two passes of a depth-first traversal, with one traversal to select an order of traversal of an outer loop and a second traversal to test nodes for having been visited previously, recursively exploring those that have not been explored); Tarjan's strongly connected components algorithm (which may use a single pass depth-first traversal and track unassigned nodes in a stack of scored nodes), or a variant of the path-based strong component algorithm by Dijkstra (which may update dual stacks in a variation of Tarjan's algorithm). Detecting strongly connected components is expected to facilitate discovery of discrete collections of nodes even when different distributed applications share the same host, which may appear in different strongly connected components due to the directionality of edges being analyzed.

In some embodiments, the connected-component detector 38 is further configured to infer the type, and some cases the identity, of services executed by each of the hosts. For example, some embodiments may maintain a set of patterns in network traffic that are indicative of different types or identities of services. For instance, some embodiments may infer based on a port number of 80 in an inbound packet header recipient address that the corresponding host is operating is a Web server. Other well-known port numbers may be associated by custom with other types of applications executing other services, such as databases, logging, monitoring, content management, keyvalue stores, MapReduce frameworks, and the like. Similar patterns in quality of service settings in headers may indicate corresponding applications, in some cases in combination with port number patterns. In another example, such patterns may map content of packet payloads to particular services. For example, some patterns may include a regular expression that identifies a string emitted by a particular service and is unlikely to be emitted by other services within a packet payload (e.g., as indicated by a term-frequency inverse document frequency (TF-IDF) analysis of network traffic payloads across a population of services, for instance, by ranking terms by TF-IDF score and selecting a highest scoring set of terms as a pattern for a given service), and some embodiments may designate the corresponding host as executing that service upon detecting the string in an outbound or inbound packet payload.

Some embodiments may further include a gateway detector 40 configured to identify one or more gateway hosts for each connected component corresponding to each distributed application. In some embodiments, the gateway detector 40 may operate upon a directed version of the connected component (such as a strongly connected component). In some embodiments, the gateway detector 40 may identify nodes, corresponding to hosts, that receive or send network traffic from or to outside the obtained graph of network traffic, for instance, those having inbound or outbound packets from or to hosts that are not within the connected component.

In another example, the gateway detector 40 may identify gateway hosts (and thus distinguish the gateway hosts from non-gateway hosts) based on timestamps of packets and session identifiers that serve as transaction identifiers within payloads of packets. In some embodiments, the network traffic data may be analyzed to trace a transaction through the connected component by identifying each message containing the transaction identifier. Some embodiments may designate as a gateway host the node of the connected component in which such a message enters or exits the connected component. In some embodiments, the transaction identifiers and messages pertaining those transactions may be obtained by querying the application monitor 18 for records pertaining to an individual transaction or a collection of transactions. In some embodiments, a plurality of transactions may be analyzed to confirm that the same gateway host is identified in each or to reveal additional gateway hosts.

Thus, some embodiments may infer a topology of the different distributed applications by identifying connected components of graphs of network traffic that describe those topologies. Further, some embodiments may identify gateway hosts to those different distributed applications based upon the direction in which packets are sent into or out of the various hosts within the different connected components.

In some embodiments, visual representations of these topologies may be presented by the view generator 42. In some embodiments, the view generator 42 may be configured to cause a graphical user interface to visually represent the topology in a computing device executing the topology analyzer, or some embodiments may cause such a presentation by sending instructions to another computing device to present such a graphical representation. For example, some embodiments may send a webpage depicting the graphical representation to a web browser executed by a client computing device of an operations engineer or developer that requested such a presentation from the topology analyzer 12. An example of a visual representation is described below with reference to FIG. 4.

Figure 3:
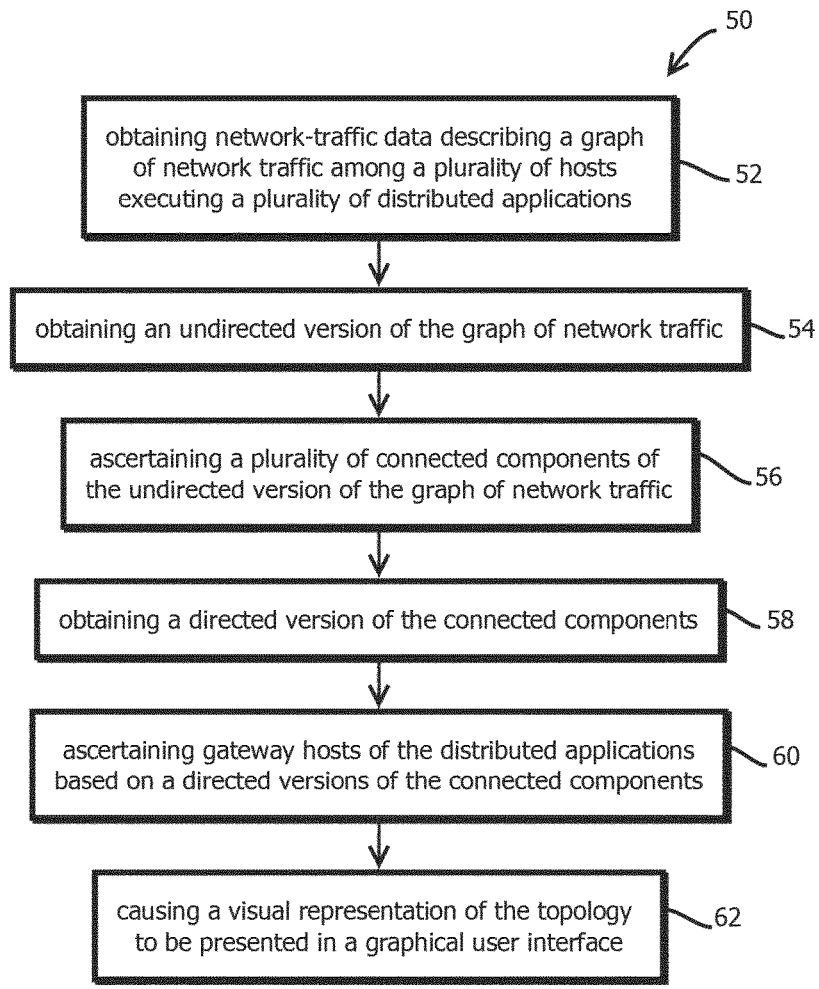
FIG. 3 is a flowchart of an example of a process to ascertain topologies of distributed applications in accordance with embodiments of the present techniques.

FIG. 3 shows an example of a process 50 that may infer topologies of distributed applications based on layer-four network traffic data (which may include making such inferences based on higher-or-lower layer protocol metadata, like IP packet headers, Ethernet frame headers, and application-layer payloads). In some embodiments, the process 50 may be executed by the above-described topology analyzer 12, but embodiments are not limited to that implementation, which is not to suggest that any other feature is limited to the examples described. In some embodiments, multiple instances the process 50 may be executed concurrently or different subsets of the process 50 may be executed concurrently. In some embodiments, some of the steps of the process 50 may be omitted or repeated, which again is not to suggest that other features are not amenable to variation relative to the examples described.

In some embodiments, the process 50 includes obtaining network-traffic data describing a graph of network traffic among a plurality of hosts executing a plurality of distributed applications, as indicated by block 52. In some embodiments, the network-traffic data may be obtained by the above-described network traffic ingest module 36, for example, by accessing data captured by the tap 34 in a datacenter.

Some embodiments may further include obtaining an undirected version of the graph of network traffic, as indicated by block 54. Or, as noted above, some embodiments may operate upon directed versions for subsequent steps.

Next, some embodiments may ascertain a plurality of connected components of the undirected version of the graph of network traffic, as indicated by block 56. In some embodiments, this may be performed by the above-described connected-component detector 38. As noted above, in some cases, this may include instead identifying strongly connected components of a directed version of the graph of network traffic.

Some embodiments may further include obtaining a directed version of the connected components, as indicated by block 58. As noted, the different directed and undirected versions of graphs may be obtained by disregarding information pertaining to directionality in some cases or by creating additional copies in which the data is transformed.

Some embodiments may include ascertaining gateway hosts of the distributed applications based on directed versions of the connected components, as indicated by block 60. In some embodiments, this may be performed by the above-described gateway detector 40.

Some embodiments further include causing a visual representation of the topology to be presented in a graphical user interface, as indicated by block 62. This may be performed by the above-described view generator 42. In some cases, causing the visual representation to be presented may be performed by sending instructions, such as webpage markup and browser-executable scripts, to another computing device that upon interpreting those instructions may result in the visual representation being presented. In some cases, the visual representation may be interactive, such that users may select icons corresponding to hosts or edges between the hosts and view metrics, events, or alarms for monitoring applications or attributes pertaining to those hosts or messages. Further, in some embodiments, users may interact with the visual representation in a graphical user interface to edit the topology, for example, by adding hosts, removing hosts, relabeling hosts, adding connections between hosts, removing connections between hosts, and the like. In response to receiving these inputs, some embodiments may update a record of the topology in memory to reflect the edits.

Figure 4:
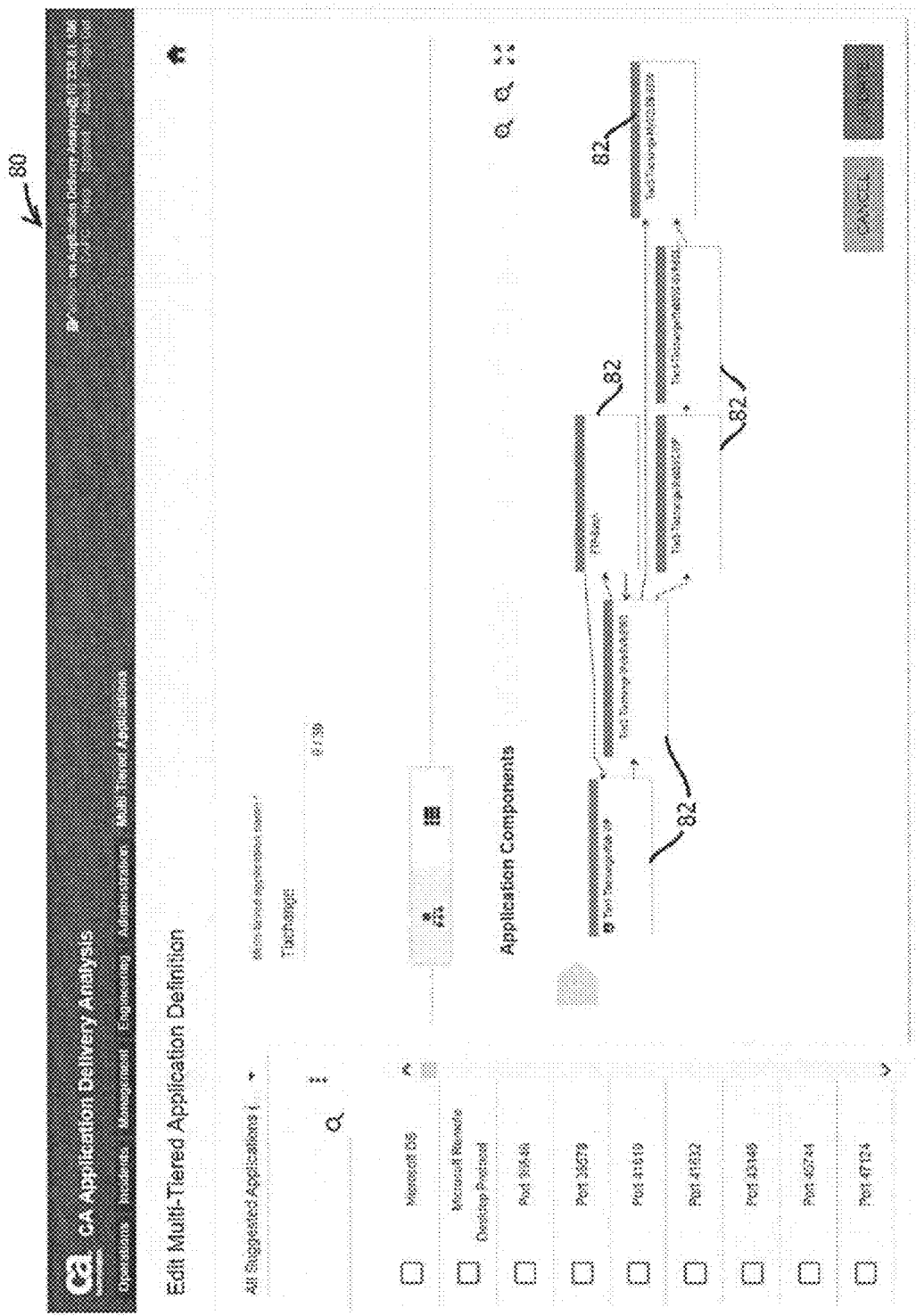
FIG. 4 is an example of a visual presentation of a distributed-application topology in accordance with embodiments of the present techniques.

An example of a visual representation 80 is shown in FIG. 4. In some embodiments, the hosts 82 may be arranged in a grid layout, for example, in a columnar arrangement of the graph (e.g., having icons depicting hosts arranged according to discrete rows, columns, or both in display space), with edges showing which hosts communicate with which other hosts and the direction of communication, in some cases. In some embodiments, groups of hosts may be indicated. For example, some embodiments may identify a group of hosts all executing the same service that all receive messages from a load balancer, and some embodiments may group that set of hosts and visually represent the group as such in the visual representation, for instance, by assigning a common color, drawing a box around the group, or the like. In some embodiments, icons representing hosts or edges may be user selectable to reveal additional information. In some embodiments, such icons may be user selectable to reveal metrics or alarms reported by the infrastructure monitor 16 or the application monitor 18.

In some embodiments, the visual representation is interactive, such that users may add or remove hosts or add or remove connections between hosts by selecting existing icons corresponding to depicted graph elements to remove such elements or by interacting with a menu to add additional elements. For example, a user may recognize that the wrong service was inferred for a given host and edit the attribute indicating the service to indicate the correct service. In another example, a user may recognize that a spurious connection was depicted and may select an icon representing a host or an edge to remove that edge. In some embodiments, these edits may be sent back to the topology analyzer 12, and the view generator 42 may update a record of the topology in memory to reflect the user edits. Subsequent request to view the topology may retrieve the updated version and cause a graphical representation of the updated version to be presented in a graphical user interface.

Figure 5:
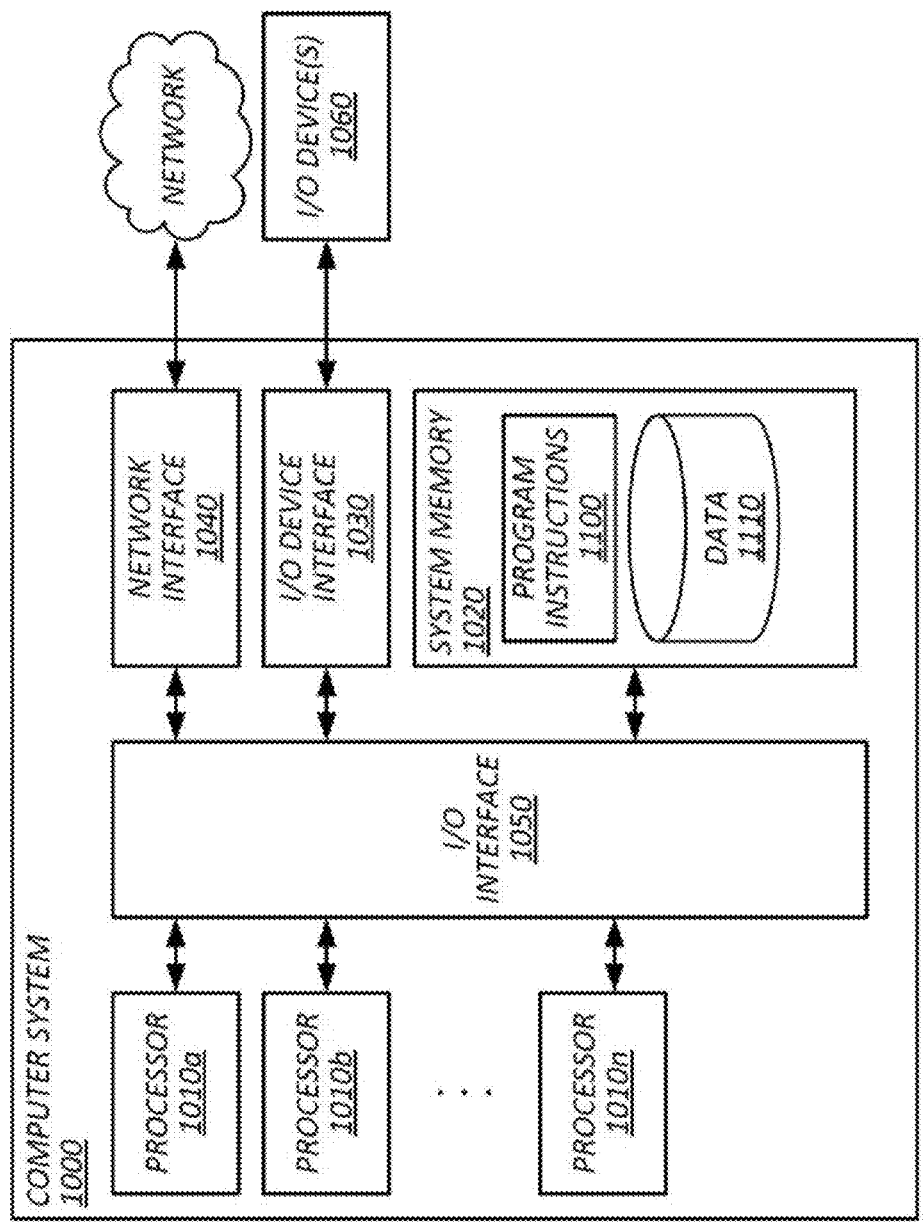
FIG. 5 is an example of a computing device by which the above techniques may be implemented.

FIG. 5 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a datacenter, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a datacenter or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the techniques. It is to be understood that the forms of the techniques shown and described herein are to be taken as examples of embodiments. Elements and materials may be substituted for those illustrated and described herein, parts and processes may be reversed or omitted, and certain features of the techniques may be utilized independently, all as would be apparent to one skilled in the art after having the benefit of this description of the techniques. Changes may be made in the elements described herein without departing from the spirit and scope of the techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A method of inferring a topology of a distributed application based on transport-layer metadata in network traffic, the method comprising: obtaining, with one or more processors, network-traffic data describing a graph of network traffic among a plurality of hosts of one or more distributed applications executing on a plurality of computing devices between which the network traffic is sent, wherein: the obtained network-traffic data describes a plurality of packets of data, the packets each have a sender network address and a sender port number, the packets each have a recipient network address and a recipient port number, the packets are sent in the course of executing the one or more distributed applications, and the graph of network traffic is a directed graph in which nodes of the graph correspond to hosts of the one or more distributed applications, edges correspond to packets sent between the hosts, and directions of edges correspond to the direction in which the packets are sent; inferring, with one or more processors, a topology of a first distributed application among the one or more distributed applications based on the network-traffic data, the topology indicating which hosts are part of the first distributed application and which hosts communicate with which other hosts in first distributed application, wherein inferring the topology comprises: ascertaining a connected component of the graph of network traffic based on the network traffic data, wherein: the connected component has nodes in which every node is reachable directly or indirectly by every other node via edges between the respective nodes in the graph of network traffic, and the connected component corresponds to the first distributed application; and ascertaining a gateway host of the first distributed application based on the connected component, the gateway host being a host through which users of the first distributed application interface with the first distributed application; and causing, with one or more processors, a visual representation of the topology to be presented in a graphical user interface.

2. The method of embodiment 1, wherein: the plurality of computing devices include computing devices of a public cloud datacenter; the topology is not entirely known prior to inferring the topology; the topology includes more than 30 hosts; the network-traffic data comprises sender and recipient addresses from more than 10,000 packets; the topology changes over time due to elastic scaling of the distributed application; ascertaining the connected component comprises recursively traversing at least part of the graph of network traffic starting from a given host in the first distributed application; the method comprises: pruning the graph of network traffic based on ages of the packets and based on amounts of packets sent between nodes before or when inferring the topology; inferring identities of services hosted by the hosts of the topology based on recipient port numbers in headers of packets sent to the respective hosts, wherein the identities of at least some of the services are indicated in the graphical user interface; and ascertaining another connected component in the graph of network traffic, the other connected component corresponding to a second distributed application different from the first distributed application.

3. The method of any one of embodiments 1-2, wherein: ascertaining the gateway host comprises determining which hosts in the connected component receive network traffic from a host that is not a member of the connected component.

4. The method of any one of embodiments 1-3, comprising: receiving a user edit to the topology after causing the visual representation of the topology to be presented; and revising the topology based on the received user edit to form an updated topology; and causing a visual representation of the updated topology to be presented in the graphical user interface.

5. The method of any one of embodiments 1-4, wherein: the visual representation depicts hosts of the connected component arranged according to a grid in the display with lines in the display indicating edges of the connected component.

6. The method of any one of embodiments 1-5, wherein: icons of the graphical user interface representing hosts are user-selectable to reveal attributes of a corresponding host, wherein the attributes include: a processor utilization metric of a computing device upon which the corresponding host executes; or a contribution of the corresponding host to a transaction latency of a transaction processed by a plurality of hosts of the first distributed application.

7. The method of any one of embodiments 1-6, wherein: the first distributed application includes a load balancer and a plurality of hosts having multiple instances of the same given service, the load balancer distributes a workload of the given service among the multiple instances; the number of hosts executing an instance of the given service is automatically scaled based on a workload of the distributed application; and the method comprises updating the topology after the automatic scaling to indicate added or removed hosts executing an instance of the given service.

8. The method of embodiment 7, wherein the visual representation visually identifies hosts executing instances of the given service as members of a group of instances of the same service.

9. The method of any one of embodiments 1-8, comprising: obtaining at least part of the network-traffic data with a network tap on a local area network in which at least part of the first distributed application executes.

10. The method of any one of embodiments 1-9, comprising: for a first packet sent to a first host, inferring a first service of the first host based on a first port number of a recipient port number of the first packet; and for a second packet sent to a second host, inferring a second service of the second host based on a second port number of a recipient port number of the second packet, the second packet, host, and service being different from the first packet, host, and service, respectively, wherein: the first service and the second service are visually associated with the first host and the second host, respectively, in the visual representation.

11. The method of any one of embodiments 1-10, comprising: inferring a service executed by a host by comparing a pattern corresponding to the service to an application-layer payload of a packet among the plurality of packets.

12. The method of any one of embodiments 1-11, wherein: the network-traffic data describes a graph of network traffic among a plurality of hosts of a plurality of distributed applications executing on the plurality of computing devices; the method comprises ascertaining a plurality of connected components corresponding to the plurality of distributed applications in an undirected version of the graph of network traffic.

13. The method of any one of embodiments 1-12, comprising: determining weights of edges of the graph of network traffic based on amounts of packets sent between hosts connected by the respective edges; and pruning the graph of network traffic based on which edges have weights that satisfy a threshold weight.

14. The method of embodiment 13, wherein: the weights of edges of the graph of network traffic are based on ages of the packets sent between hosts connected by the respective edges.

15. The method of any one of embodiments 1-14, wherein: ascertaining the connected component comprises performing a depth-first traversal of at least a portion of the graph of network traffic.

16. The method of any one of embodiments 1-15, wherein: ascertaining the connected component comprises performing a breadth-first traversal of at least a portion of the graph of network traffic.

17. A tangible, non-transitory, machine-readable medium storing instructions that when executed by a data processing apparatus cause the data processing apparatus to perform operations comprising: the operations of any of embodiments 1-16.

18. A system, comprising: one or more processors; and memory storing instructions that when executed by the processors cause the processors to effectuate operations comprising: the operations of any of embodiments 1-16.

What is claimed is:

1. A method of inferring a topology of a distributed application based on transport-layer metadata in network traffic, the method comprising:
obtaining, with one or more processors, network-traffic data describing a graph of network traffic among a plurality of hosts of one or more distributed applications executing on a plurality of computing devices between which the network traffic is sent, wherein:
the obtained network-traffic data describes a plurality of packets of data,
the packets each have a sender network address and a sender port number, the packets each have a recipient network address and a recipient port number, the packets are sent in the course of executing the one or more distributed applications, and the graph of network traffic is a directed graph in which nodes of the graph correspond to hosts of the one or more distributed applications, edges correspond to packets sent between the hosts, and directions of edges correspond to the direction in which the packets are sent;

inferring, with one or more processors, a topology of a first distributed application among the one or more distributed applications based on the network-traffic data, the topology indicating which hosts are part of the first distributed application and which hosts communicate with which other hosts in first distributed application, wherein inferring the topology comprises:

ascertaining a connected component of the graph of network traffic based on the network traffic data, wherein:

the connected component has nodes in which every node is reachable directly or indirectly by every other node via the edges between the respective nodes in the graph of network traffic, and the connected component corresponds to the first distributed application; and ascertaining a gateway host of the first distributed application based on the connected component, the gateway host being a host through which users of the first distributed application interface with the first distributed application; and causing, with one or more processors, a visual representation of the topology to be presented in a graphical user interface, wherein:

icons of the graphical user interface representing hosts are user-selectable to reveal attributes of a corresponding host, wherein the attributes include:

a processor utilisation metric of a computing device upon which the corresponding host executes; or a contribution of the corresponding host to a transaction latency of a transaction processed by a plurality of hosts of the first distributed application.

2. The method of claim 1, wherein:

the plurality of computing devices include computing devices of a public cloud datacenter;

the topology is not entirely known prior to inferring the topology;

the topology includes more than 30 hosts;

the network-traffic data comprises sender and recipient addresses from more than 10,000 packets;

the topology changes over time due to elastic scaling of the distributed application;

ascertaining the connected component comprises recursively traversing at least part of the graph of network traffic starting from a given host in the first distributed application;

the method comprises:

pruning the graph of network traffic based on ages of the packets and based on amounts of packets sent between nodes before or when inferring the topology;

inferring identities of services hosted by the hosts of the topology based on recipient port numbers in headers of packets sent to the respective hosts, wherein the identities of at least some of the services are indicated in the graphical user interface; and ascertaining another connected component in the graph of network traffic, the other connected component corresponding to a second distributed application different from the first distributed application.

3. The method of claim 1, wherein:

ascertaining the gateway host comprises determining which hosts in the connected component receive network traffic from a host that is not a member of the connected component.

4. The method of claim 1, comprising:

receiving a user edit to the topology after causing the visual representation of the topology to be presented; and revising the topology based on the received user edit to form an updated topology; and causing a visual representation of the updated topology to be presented in the graphical user interface.

5. The method of claim 1, wherein:

the visual representation depicts hosts of the connected component arranged according to a grid in the display with lines in the display indicating edges of the connected component.

6. The method of claim 1, wherein:

the first distributed application includes a load balancer and a plurality of hosts having multiple instances of the same given service, the load balancer distributes a workload of the given service among the multiple instances;

the number of hosts executing an instance of the given service is automatically scaled based on a workload of the distributed application; and the method comprises updating the topology after the automatic scaling to indicate added or removed hosts executing an instance of the given service.

7. The method of claim 6, wherein the visual representation visually identifies hosts executing instances of the given service as members of a group of instances of the same service.

8. The method of claim 1, comprising:

obtaining at least part of the network-traffic data with a network tap on a local area network in which at least part of the first distributed application executes.

9. The method of claim 1, comprising:

for a first packet sent to a first host, inferring a first service of the first host based on a first port number of a recipient port number of the first packet; and for a second packet sent to a second host, inferring a second service of the second host based on a second port number of a recipient port number of the second packet, the second packet, host, and service being different from the first packet, host, and service, respectively, wherein:

the first service and the second service are visually associated with the first host and the second host, respectively, in the visual representation.

10. The method of claim 1, comprising:

inferring a service executed by a host by comparing a pattern corresponding to the service to an application-layer payload of a packet among the plurality of packets.

11. The method of claim 1, wherein:

the network-traffic data describes a graph of network traffic among a plurality of hosts of a plurality of distributed applications executing on the plurality of computing devices;

the method comprises ascertaining a plurality of connected components corresponding to the plurality of distributed applications in an undirected version of the graph of network traffic.

12. The method of claim 1, comprising:
determining weights of edges of the graph of network traffic based on numbers of packets sent between hosts connected by the respective edges; and
pruning the graph of network traffic based on which edges have weights that satisfy a threshold weight.

13. The method of claim 1, wherein:
ascertaining the connected component comprises performing a depth-first traversal of at least a portion of the graph of network traffic.

14. The method of claim 1, wherein:
ascertaining the connected component comprises performing a breadth-first traversal of at least a portion of the graph of network traffic.

15. The method of claim 1, wherein:
inferring the topology of the first distributed application comprises steps for inferring a topology based on network traffic data.

16. A tangible, non-transitory, machine-readable medium storing instructions that when executed by one or more computers effectuate operations comprising:
obtaining, with one or more processors executing at least some of the instructions stored on the medium, network-traffic data describing a graph of network traffic among a plurality of hosts of one or more distributed applications executing on a plurality of computing devices between which the network traffic is sent, wherein:
the obtained network-traffic data describes a plurality of packets of data,
the packets each have a sender network address and a sender port number,
the packets each have a recipient network address and a recipient port number,
the packets are sent in the course of executing the one or more distributed applications, and
the graph of network traffic is a directed graph in which nodes of the graph correspond to hosts of the one or more distributed applications, edges correspond to packets sent between the hosts, and directions of edges correspond to the direction in which the packets are sent;
inferring, with one or more processors executing at least some of the instructions stored on the medium, a topology of a first distributed application among the one or more distributed applications based on the network-traffic data, the topology indicating which hosts are part of the first distributed application and which hosts communicate with which other hosts in first distributed application, wherein inferring the topology comprises:
ascertaining a connected component of the graph of network traffic based on the network traffic data, wherein:
the connected component has nodes in which every node is reachable directly or indirectly by every other node via edges between the respective nodes in the graph of network traffic, and
the connected component corresponds to the first distributed application; and
ascertaining a gateway host of the first distributed application based on the connected component, the gateway host being a host through which users of the first distributed application interface with the first distributed application; and
causing, with one or more processors executing at least some of the instructions stored on the medium, a visual representation of the topology to be presented in a graphical user interface, wherein:
icons of the graphical user interface representing hosts are user-selectable to reveal attributes of a corresponding host, wherein the attributes include:
a processor utilisation metric of a computing device upon which the corresponding host executes; or
a contribution of the corresponding host to a transaction latency of a transaction processed by a plurality of hosts of the first distributed application.

17. The medium of claim 16, wherein:
ascertaining the gateway host comprises determining which hosts in the connected component receive network traffic from a host that is not a member of the connected component.

18. The medium of claim 16, comprising:
receiving a user edit to the topology after causing the visual representation of the topology to be presented; and
revising the topology based on the received user edit to form an updated topology; and
causing a visual representation of the updated topology to be presented in the graphical user interface.

19. A method of inferring a topology of a distributed application based on transport-layer metadata in network traffic, the method comprising:
obtaining, with one or more processors, network-traffic data describing a graph of network traffic among a plurality of hosts of one or more distributed applications executing on a plurality of computing devices between which the network traffic is sent, wherein:
the obtained network-traffic data describes a plurality of packets of data,
the packets each have a sender network address and a sender port number,
the packets each have a recipient network address and a recipient port number,
the packets are sent in the course of executing the one or more distributed applications, and
the graph of network traffic is a directed graph in which nodes of the graph correspond to hosts of the one or more distributed applications, edges correspond to packets sent between the hosts, and directions of edges correspond to the direction in which the packets are sent;
inferring, with one or more processors, a topology of a first distributed application among the one or more distributed applications based on the network-traffic data, the topology indicating which hosts are part of the first distributed application and which hosts communicate with which other hosts in first distributed application, wherein inferring the topology comprises:
ascertaining a connected component of the graph of network traffic based on the network traffic data, wherein:
the connected component has nodes in which every node is reachable directly or indirectly by every other node via the edges between the respective nodes in the graph of network traffic, and
the connected component corresponds to the first distributed application; and ascertaining a gateway host of the first distributed application based on the connected component, the gateway host being a host through which users of the first distributed application interface with the first distributed application; and causing, with one or more processors, a visual representation of the topology to be presented in a graphical user interface, wherein:
the plurality of computing devices include computing devices of a public cloud datacenter;
the topology is not entirely known prior to inferring the topology;
the topology includes more than 30 hosts;
the network-traffic data comprises sender and recipient addresses from more than 10,000 packets;
the topology changes over time due to elastic scaling of the distributed application;
ascertaining the connected component comprises recursively traversing at least part of the graph of network traffic starting from a given host in the first distributed application;
the method comprises:
pruning the graph of network traffic based on ages of the packets and based on amounts of packets sent between nodes before or when inferring the topology;
inferring identities of services hosted by the hosts of the topology based on recipient port numbers in headers of packets sent to the respective hosts, wherein the identities of at least some of the services are indicated in the graphical user interface; and
ascertaining another connected component in the graph of network traffic, the other connected component corresponding to a second distributed application different from the first distributed application.

20. A method of inferring a topology of a distributed application based on transport-layer metadata in network traffic, the method comprising:
obtaining, with one or more processors, network-traffic data describing a graph of network traffic among a plurality of hosts of one or more distributed applications executing on a plurality of computing devices between which the network traffic is sent, wherein:
the obtained network-traffic data describes a plurality of packets of data,
the packets each have a sender network address and a sender port number,
the packets each have a recipient network address and a recipient port number,
the packets are sent in the course of executing the one or more distributed applications, and
the graph of network traffic is a directed graph in which nodes of the graph correspond to hosts of the one or more distributed applications, edges correspond to packets sent between the hosts, and directions of edges correspond to the direction in which the packets are sent;

determining, with one or more processors, weights of edges of the graph of network traffic based on numbers of packets sent between hosts connected by the respective edges;
pruning, with one or more processors, the graph of network traffic based on which edges have weights that satisfy a threshold weight, wherein the weights of edges of the graph of network traffic are based on ages of the packets sent between hosts connected by the respective edges,
inferring, with one or more processors, a topology of a first distributed application among the one or more distributed applications based on the graph of network-traffic data, the topology indicating which hosts are part of the first distributed application and which hosts communicate with which other hosts in first distributed application, wherein inferring the topology comprises:
ascertaining a connected component of the graph of network traffic based on the network traffic data, wherein:
the connected component has nodes in which every node is reachable directly or indirectly by every other node via the edges between the respective nodes in the graph of network traffic, and
the connected component corresponds to the first distributed application; and
ascertaining a gateway host of the first distributed application based on the connected component, the gateway host being a host through which users of the first distributed application interface with the first distributed application; and
causing, with one or more processors, a visual representation of the topology to be presented in a graphical user interface.

* * * * *